United States Patent [19]

Kimball

[11] 4,077,429

[45] Mar. 7, 1978

[54] PUSH-FIT INLET VALVE ASSEMBLY

[75] Inventor: Everett L. Kimball, Wilmington, Del.

[73] Assignee: Ronson Corporation, Bridgewater, N.J.

[21] Appl. No.: 754,037

[22] Filed: Dec. 23, 1976

[51] Int. Cl.$^2$ .................................. F16K 24/00
[52] U.S. Cl. .................... 137/588; 141/302; 141/348; 141/305; 137/846; 431/344
[58] Field of Search .............. 141/285, 301, 302, 348, 141/349, 305; 137/588, 846; 431/150, 344

[56] References Cited

U.S. PATENT DOCUMENTS

| | | | |
|---|---|---|---|
| 3,217,762 | 11/1965 | Burchett | 137/588 |
| 3,277,674 | 10/1966 | Klein et al. | 431/150 |
| 3,414,025 | 12/1968 | Smith | 137/588 |
| 3,464,442 | 9/1969 | Hattori | 137/588 |
| 3,473,704 | 10/1969 | O'Donnell | 137/588 |
| 3,540,402 | 11/1970 | Kocher | 137/588 |
| 3,718,165 | 2/1973 | Grothoff | 141/302 |
| 3,746,059 | 7/1973 | Mizuguchi | 137/588 |
| 3,871,422 | 3/1975 | Elson et al. | 141/348 |
| 3,941,149 | 3/1976 | Mittleman | 137/846 |

*Primary Examiner*—Martin P. Schwadron
*Assistant Examiner*—H. Jay Spiegel
*Attorney, Agent, or Firm*—Toren, McGeady and Stanger

[57] ABSTRACT

A push-fit inlet valve assembly for the opening into the fuel chamber, such as in a lighter, consists of a flexible valve member and a rigid stem fitted into a bore in the valve member. The valve member, tightly secured in the fill opening, normally effects the closure of the opening preventing any escape of the pressurized fuel. To add fuel, the stem is pressed inwardly and displaces the valve member from sealing contact with the opening and affords communication between the interior of the chamber and the ambient atmosphere. Such communication between the chamber and the atmosphere is provided by a groove formed in the outer surface of the valve member which is opened to the chamber when the stem presses the valve member inwardly.

20 Claims, 5 Drawing Figures

PUSH-FIT INLET VALVE ASSEMBLY

SUMMARY OF THE INVENTION

The present invention is directed to a valve closure for a fuel chamber such as in a gas lighter using a liquid petroleum gas and, more particularly, it is directed to a two-part push-fit inlet valve assembly.

Inlet valves for gas lighters and similar applications are known, however, they generally require a number of parts including metal parts produced on screw machines or eyelet machines, coil springs, gaskets, and O-rings for effecting the desired sealing or closing action. The variety of parts used renders the valves relatively costly. Furthermore, the parts must be assembled using highly complex equipment before the valve can be placed in the lighter and such assembly increases the cost. The expense of installing the valve is further increased by the need for threading the member into which the valve is secured.

Therefore, it is the primary object of the present invention to simplify both the structure of the inlet valve assembly and the manner in which it is installed in the fill opening into a fuel chamber. By such simplification the costs involved in producing and installing inlet valves in the past is greatly reduced.

Another object of the invention is to provide an inlet valve assembly which is easily operable, assures rapid filling of the fuel chamber, and provides a signal when the proper amount of fuel has been supplied into the chamber.

In accordance with the present invention, the inlet valve assembly consists of two simple parts, a flexible valve member and a rigid stem which fits into a bore in the valve member. The valve member is shaped to provide tightly fitting engagement with the wall forming the opening into the fuel chamber so that it provides a seal against any leakage of fuel out of the chamber. The stem extends through the bore in the valve member and assists in holding it in tightly fitting engagement with the opening. The end of the bore in the valve member terminates in a slit which is normally closed. Further, the outer surface of the valve member which seats against the axially extending surface of the opening has a groove extending in the axial direction which is closed to the interior of the fuel chamber when the valve member is in its normal sealing position.

To facilitate rapid filling of the fuel chamber a refill container is pressed against the stem and, in turn, the stem is pressed inwardly causing the flexible valve member to project into the fuel chamber so that its seal with the inner surface of the chamber is broken. While the outer surface of the valve member still remains in surface contact with the opening, the groove in the outer surface is placed in communication with the interior of the chamber and, since the groove extends outwardly into communication with the ambient atmosphere, the interior of the chamber is exposed to atmospheric pressure. By providing a step for the inward movement of the stem, further inward movement of the refill container against the stem supplies the liquid petroleum gas through a bore in the stem into the bore in the valve member and the pressure differential between the gas and the atmospheric pressure within the chamber opens the slit with the gas flowing into the chamber. As the chamber fills with the liquid petroleum gas to a given level, a liquid spray is forced out along an exhaust path through the groove in the outer surface of the valve member providing a signal that the filling operation should be stopped.

With the chamber properly filled, the refill container is removed and the flexible or resilient character of the valve member causes it to return to the sealing position with the stem moving outwardly. The shaped configuration of the outer surface of the valve member assists its return to the closed position and also its sealing engagement with the opening. The manner in which the stem is secured within the valve member assures positive securement of the assembly in the opening and prevents any accidental displacement of the valve member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
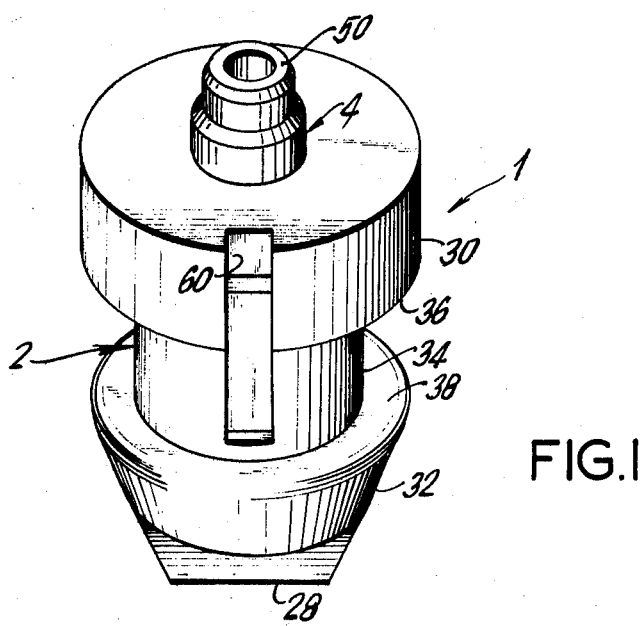
FIG. 1 is a perspective view of the inlet valve assembly.
Figure 2:
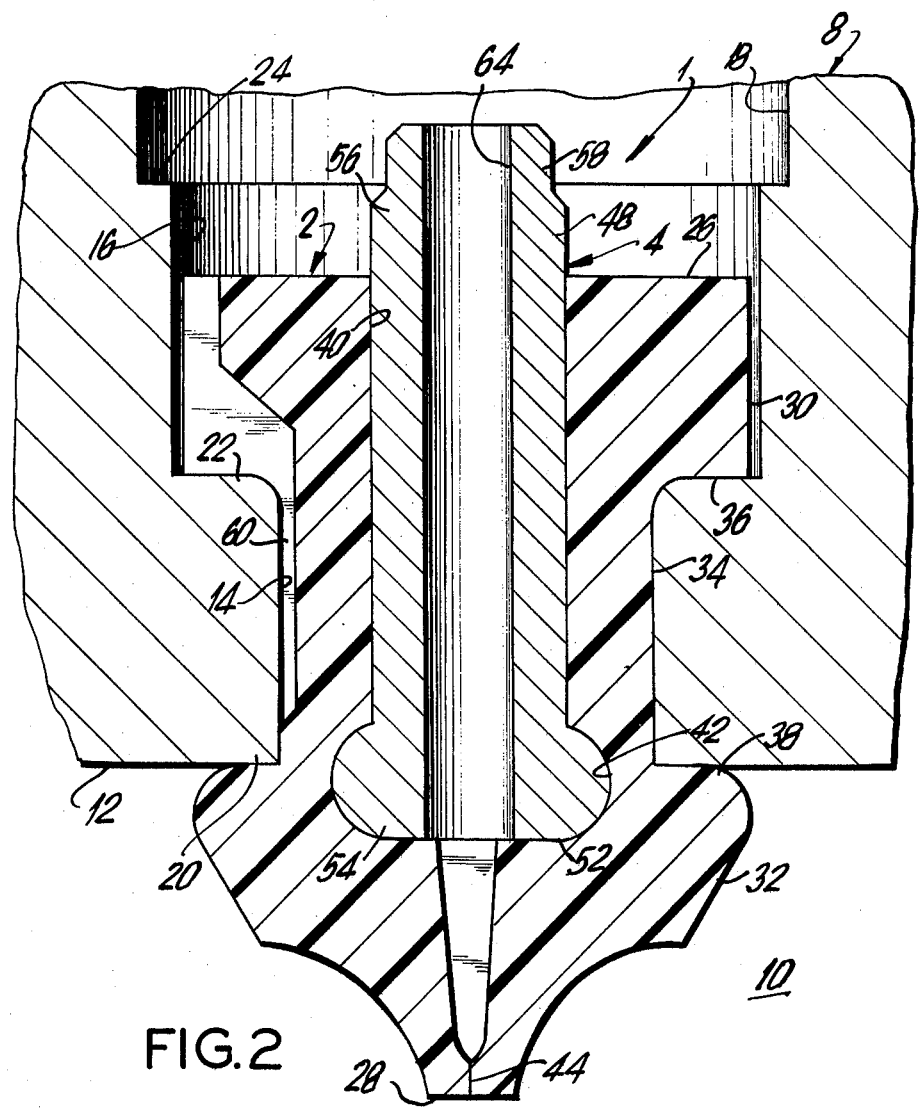
FIG. 2 is a partial cross-sectional view of the inlet valve assembly of FIG. 1 in sealing engagement with the fill opening to a fuel chamber.
Figure 3:
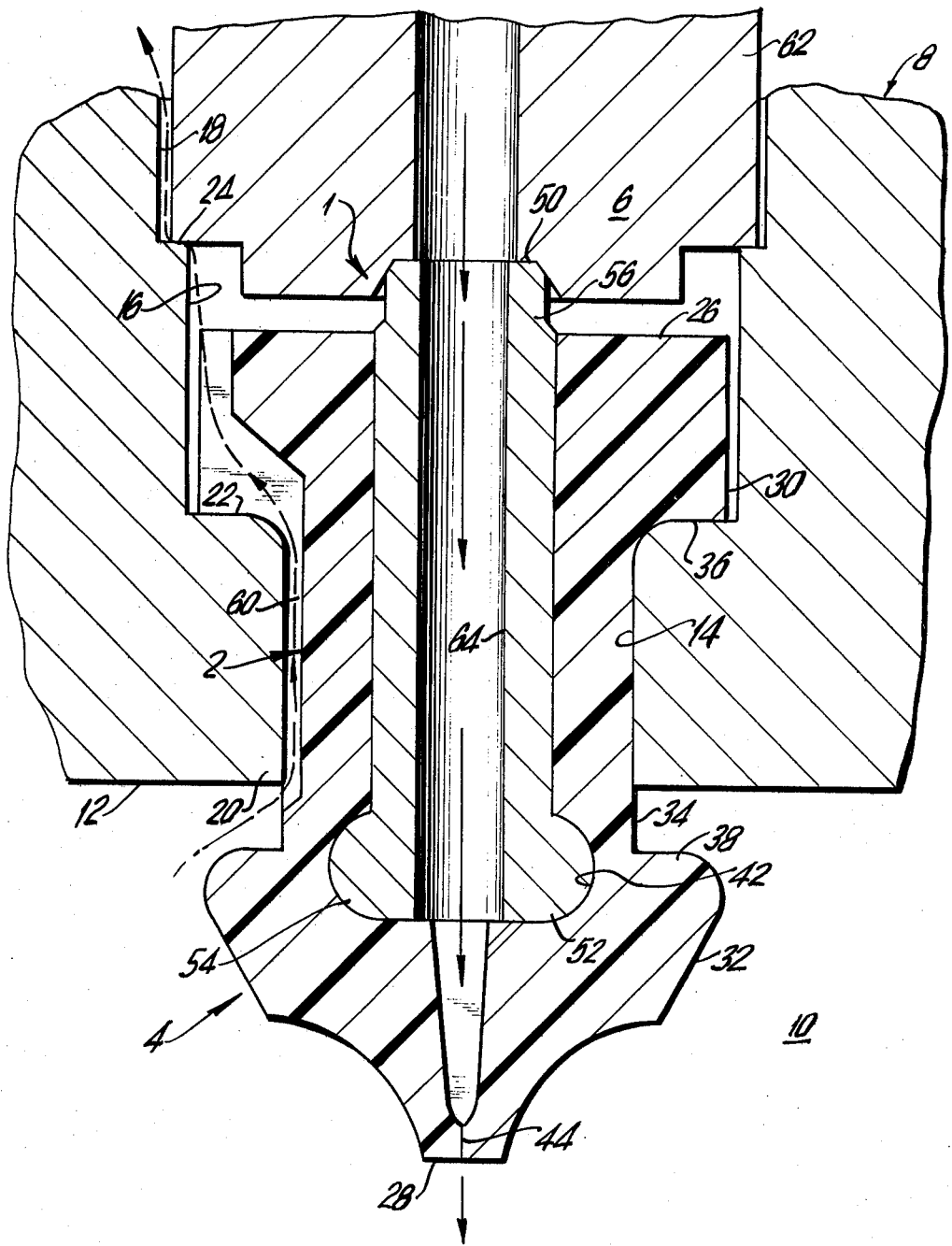
FIG. 3 is a partial cross-sectional view similar to FIG. 2 showing the inlet valve assembly in the opened position for charging fuel into the fuel chamber.

In FIG. 1 an inlet valve assembly 1 is illustrated consisting of a shaped valve member 2 formed of a flexible material and a stem 4 formed of a rigid material. In use, as shown in FIGS. 2 and 3, the inlet valve assembly 1 is fitted into an opening 6 in a housing 8 which forms a fuel chamber 10, such as a fuel chamber for a gas lighter using liquid petroleum gas.

The opening 6 extends axially outwardly from the inner surface 12 of the fuel chamber 10 and has a first axial extending portion 14, a second axially extending portion 16 and a third axially extending portion 18. The first portion 14 has the smallest diameter with the diameters increasing outwardly through the second and third portions 16 and 18. As a result of the different diameter portions of the opening a first shoulder 20 is formed by the inner surface 12 of the housing where it encircles the opening. At the opposite end of the first portion 14 a second shoulder 22 is formed which faces outwardly from the fuel chamber 10. A third shoulder 24 is provided at the junction of the second portion 16 and the third portion 18.

The valve member 2 is fitted into the opening 6 and has a first end 26 facing outwardly and a second end 28 located within the fuel chamber 10. Extending between the ends, the outer wall surface of the valve member is generally cylindrically shaped, however, the outer wall surface is configured so that it fits in sealing engagement with the surface of the first portion 14 of the opening 6. The outer surface of the valve member includes a first annular or toroidally shaped protuberance 30 extending from the first end of the valve member. A second annular or toroidally shaped protuberance 32 is spaced axially from the first protuberance and is located within the fuel chamber. Extending axially between the two protuberances is an annular recessed portion 34. The diameter of the recessed portion 34 relative to the diameter of the first portion 14 of the opening is such that the flexible material forming the valve member fits in tight sealing engagement with the surface of the first portion 14 of the opening. Further, the axial length of the annular recessed portion 34 extending between the shoulder 36 on the first protuberance and the shoulder 38 on the second protuberance is less than the axial length of the first portion. Due to this axial length differential, when the valve member is inserted into the opening with the shoulders 36 and 38 on the protuberances in engagement with the shoulders 22, 20, respectively, on the housing, the valve member is stretched and, because of its flexible character, it provides a squeezing action against the opposite ends of the first portion 14.

A bore 40 extends centrally through the valve member from the first end 26 to a position closely spaced from the second end 28. The bore has a uniform diameter from the first end 26 to a location in the range of the shoulder 38 on the protuberance 32 where the bore is widened by an annular groove 42 which projects outwardly from the adjacent uniform diameter portion of the bore. From the annular groove 42 to the end of the bore adjacent the second end of the valve member 28, the bore narrows down and terminates in a slit 44 extending between the second end of the valve member and the adjacent end of the bore. Because of the flexible character of the valve member, when pressurized fuel is contained within the chamber 10 and the bore 40 is exposed to atmospheric pressure, the pressure of the fuel keeps the slit closed so that there is no leakage or loss of pressure within the chamber.

The second end 28 of the valve chamber is spaced axially from the second protuberance 32 and the outer surfaces of the valve member taper inwardly from the protuberance to the second end.

As can be seen in the drawings, the stem 4 fits within the bore 40 in the valve member. Stem 4 has a first end 50 projecting outwardly from the valve member and a second end 52 seated against the inner surface of the bore formed by the junction between the inner end of the annular groove 42 and the inner tapering end of the bore. At this end 52, the stem has a toroidally shaped projecting portion 54 which seats in form fitting engagement with the surface of the annular groove 42 in the bore. The portion 56 of the stem extending axially outwardly from the projecting portion 54 has approximately the same diameter as the bore 40 in the valve member so that it fits tightly within the bore. Outwardly from the first end 26 of the valve member, the stem has a reduced diameter portion 58 which terminates at the first end 50 of the stem.

Starting at a location closely spaced from the shoulder 38 on the second protuberance 32 of the valve member, a groove 60 is formed in the outer surface of the member and extends axially to its first end 26. The groove extends through a major portion of the annular recessed portion 34 and through the full axial length of the first protuberance 30 of the valve member. In the position of the valve member shown in FIG. 2 the groove 60 is closed off from the interior of the fuel chamber 10 by the protuberance 32 and the small axial length of the annular recess portion 34 extending between the shoulder 38 and the adjacent end of the groove.

In FIG. 2 the inlet valve assembly is in sealed engagement within the opening 6 in the fuel chamber 10 with the contacting shoulders 20 and 38 blocking any leakage outwardly from the fuel chamber between the contacting surfaces of the opening 6 and the valve member 2. When the fuel chamber requires filling, the multi-fill tip nozzle 62 on a refill container, not shown, is pressed against the first end 50 of the stem 4 depressing the stem inwardly through the valve member toward the chamber 10. As can be seen in FIG. 3, the nozzle 60 presses the stem inwardly until the it contacts the third shoulder 24 formed in the opening. In this position the inward movement of the stem stretches the valve member and displaces the shoulder 38 out of contact with the shoulder 20 on the housing. The extent to which the stem is depressed inwardly is sufficient to bias the annular recessed portion 34 of the valve member into the valve chamber so that the inner end of the groove 60 is open to the chamber. Since the groove is open to the ambient atmosphere the interior of the chamber 10 is exposed to atmospheric pressure, and with the nozzle 60 pressed against the stem, flow from the refill container passes through the bore 64 in the stem into the end of the bore 40 in the opposite end of the valve member. The pressure of the inflowing fluid from the fill container being greater than atmospheric pressure causes the slit 44 to open permitting the chamber to be filled. Air within the chamber is exhausted through the groove 60. As the fluid from the container reaches a selected level so that a given portion of the chamber remains unfilled, a liquid spray is forced out of the chamber through the groove 60 signalling that the filling operation has been completed and that the nozzle 60 should be removed from the end of the stem. With the removal of the nozzle, the flexible character of the valve member 2 causes it to return to the position shown in FIG. 2 with the first end 50 of the stem 4 moving outwardly away from the first end 26 of the valve member. The inlet valve assembly is again in sealing contact with the housing preventing any leakage out of the fuel chamber.

The pressure differential between the multi-fill container and the fuel chamber 10 assures that a rapid filling of the chamber can be carried out in a single operation without the necessity to effect the filling in several stages as is required with many of the presently used inlet valves.

With the rigid stem 4 in place within the valve member 2 it provides internal support preventing any collapse of the valve wall under the internal fuel chamber pressure. The support provided by the stem aids in preventing any leakage between the valve member and the walls of the opening. Moreover, the projecting portion on the end of the stem also assures that the valve member is adequately held within the opening in the housing.

While the stem 4 in the embodiment shown in FIGS. 1 to 3 has a toroidally shaped projecting portion 54 seated in the annular groove 42, it is possible to operate the valve assembly without such interengaging structure.

Figure 4:
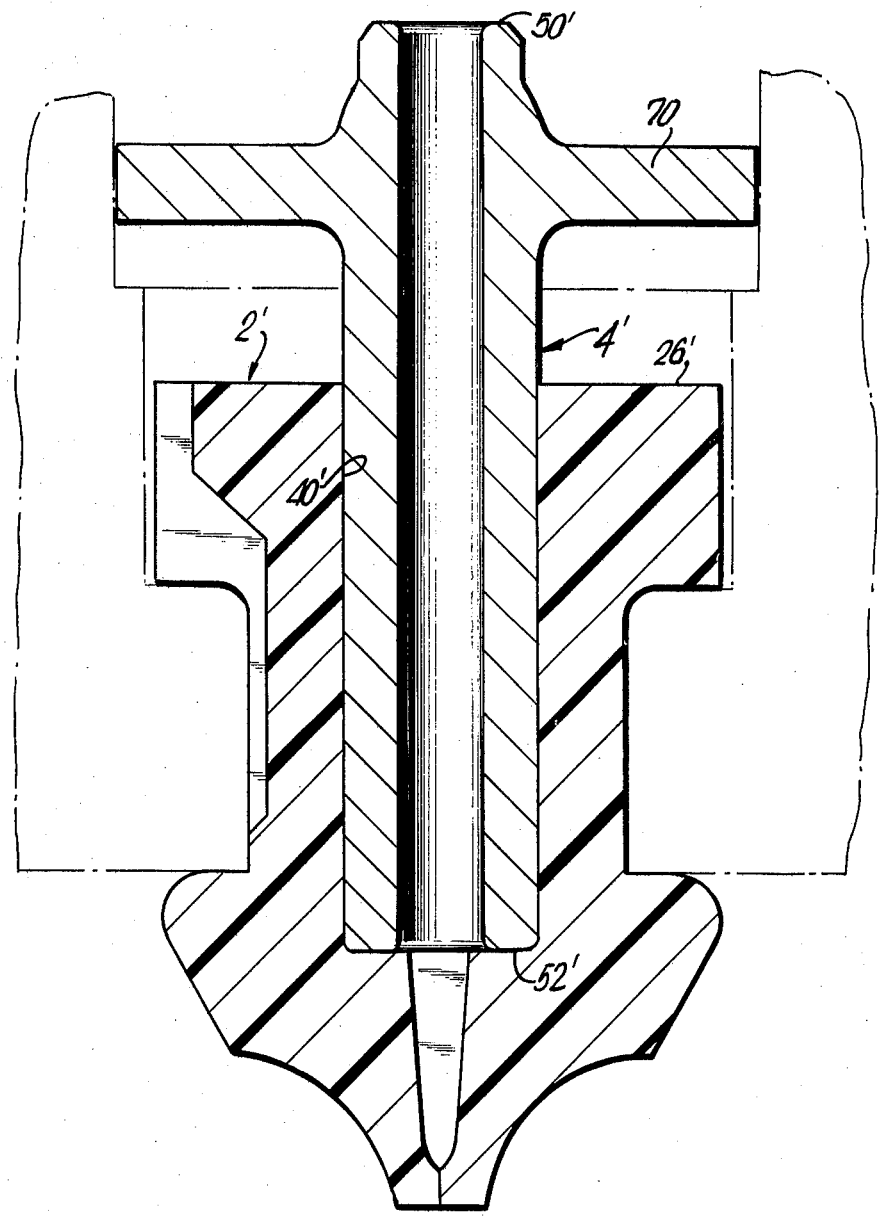
FIG. 4 is an axially extending cross-sectional view of another embodiment of the inlet valve assembly.
Figure 5:
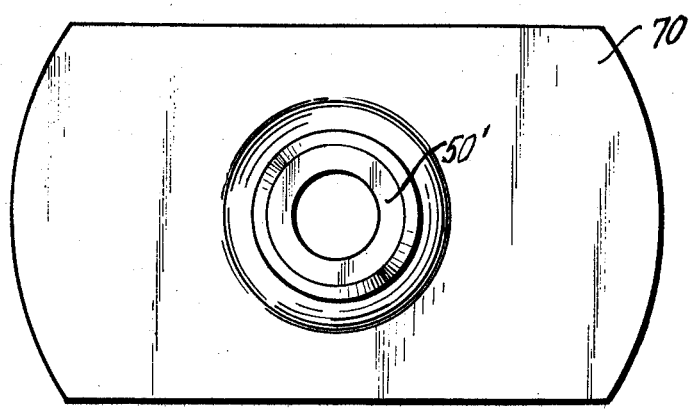
FIG. 5 is a top end view of the stem illustrated in FIG. 4.

It has been found that the projecting portion 54 and the corresponding groove 42 can be eliminated, note the embodiment illustrated in FIGS. 4 and 5.

In FIG. 4 the valve assembly consists of a valve member 2' and a stem 4'. The valve member 2' is similar to valve member 2 without the annular groove 42 within its bore. Stem 4' is similar to stem 4 but without the projecting portion 54. It has a first end 50' projecting outwardly from the valve member and a second end 52' located at the inner end of the bore 40' in the valve member. Within the bore 40' the outer surface of the stem 4' is continuous without any projecting portions, and is in tightly fitting engagement with the valve member.

On the stem 4', between the first end 26' of the valve member and its first end 50', is an outwardly extending flange 70 which acts as a stop for the inward movement of the stem. As indicated in FIG. 5, the flange 70 has a generally rectangular shape.

The stem, as depicted in FIG. 4, provides adequate support for the valve member to prevent it from being accidentally displaced from the opening in the housing forming the fuel chamber. The inward movement of the stem causes the valve member to stretch and open the interior of the fuel chamber to the ambient atmosphere. In the event the nozzle on the refill container used for supplying fuel is too small to contact the third shoulder 24 on the housing 8, note FIG. 3, the flange 70 on the stem acts as a stop preventing any further inward movement of the stem.

A typical material for use in the valve member in nitrile, however, any elastomeric material which is compatible with butane and has the required elastic properties could be used. A typical material for the stem would be brass, however, a suitable plastic material or a zinc die casting could also be used.

While specific embodiments of the invention have been shown and described in detail to illustrate the application of the inventive principles, it will be understood that the invention may be embodied otherwise without departing from such principles.

I claim:

1. An inlet valve assembly comprising, in combination, a valve member formed of a flexible material, and a stem formed of a rigid material and fitted into said valve member, said valve member having a first end, a second end spaced from said first end, and a generally cylindrically shaped outer wall surface extending between said first and second ends, said wall surface having a first annular shaped protuberance adjacent said first end, a second annular shaped protuberance adjacent said second end, and an annular recessed portion relative to said first and second protuberances extending between said first and second protuberances, said valve member having a bore extending therethrough from said first end toward said second end, the bore terminating at a location intermediate said second end and the adjacent end of the annular recessed portion of said wall surface, said valve member having a normally closed slit therein extending between the second end thereof and the adjacent end of said bore, said stem being axially elongated and having a first end and a second end spaced from said first end with a bore extending axially therethrough between said first and second ends thereof, said second end of said stem being positioned within the bore in said valve member and the first end of said stem being spaced from the second end thereof in the direction toward the first end of said valve member, the bore in said stem opening into the bore in said valve member, and a groove formed inwardly into the annular recessed portion of said wall surface and extending in the axial direction of the bore through said valve member from a point adjacent said second protuberance to said first protuberance and extending axially in the outer surface of the first protuberance for at least a part of the axial length thereof.

2. An inlet valve assembly, as set forth in claim 1, wherein said stem having an axial length between the first end and second end thereof which is greater than the axial length of the bore in said valve member.

3. An inlet valve assembly, as set forth in claim 1, wherein the bore in said valve member having an outwardly projecting annular groove formed therein in the range of said second protuberance and the adjacent end of said annular recessed portion and said stem having a toroidally shaped projecting portion extending outwardly from the outer surface thereof adjacent the second end thereof with said projecting portion being seated in the form-fitting contact with the surface of said annular groove in the bore in said valve member.

4. An inlet valve assembly, as set forth in claim 1, wherein said first protuberance being located at the first end of said valve member and said second protuberance being spaced from the second end of said valve member, and the outer surface of said valve member tapering inwardly from said second protuberance to the second end thereof.

5. An inlet valve assembly, as set forth in claim 4, wherein said bore in said valve member having a reduced cros-sectional portion extending between said annular groove therein and said slit in the second end of the valve member.

6. An inlet valve assembly, as set forth in claim 1, wherein said valve member being formed of an elastomeric material compatible with butane.

7. An inlet valve assembly, as set forth in claim 6, wherein said stem being formed of brass.

8. A member comprising wall means forming a closed chamber, said wall means having an outside surface and an inside surface with an axially extending opening therethrough from the outside surface to the inside surface for supplying a pressurized fluid into said chamber, an inlet valve assembly positioned within and sealing the opening into said chamber, wherein the improvement comprises that said wall means forms a first shoulder facing into said chamber, and a second shoulder spaced axially outwardly from said chamber and facing in the opposite direction from said first shoulder, said inlet valve assembly comprising a valve member formed of a flexible material and fitted into the opening through said wall means, and a stem formed of a rigid material and fitted into said valve member, said valve member having a first end, a second end spaced from said first end and a generally cylindrically shaped outer wall surface extending between said first and second ends, said wall surface having a first annular shaped protuberance adjacent said first end, a second annular shaped protuberance adjacent said second end and an annular recessed portion relative to said first and second protuberances and extending between said second and first protuberances, said first protuberance forming a first shoulder facing toward the second end of said valve member and disposed in surface contact with said second shoulder in said opening, said second protuberance forming a second shoulder facing toward the first end of said valve member and disposed in displaceable contact with the first shoulder in said opening, said valve member having a bore extending therethrough from said first end toward said second end, the bore terminating at a location intermediate said second end and the adjacent end of the annular recessed portion of said wall surface, said valve member having a normally closed slit therein extending between the second end thereof and the adjacent end of said bore, said stem being axially elongated and having a first end and a second end spaced from said first end with a bore extending axially therethrough between said first and said second ends thereof, said second end of said stem being positioned within the bore in said valve member and the first end of said stem being spaced from the second end thereof in the direction toward the first end of said valve member, the bore in said stem opening into the bore in said valve member, and a groove formed in the annular recessed portion of said wall surface and extending in the axial direction of the bore to said valve member from a point adjacent said second protuberance to said first protuberance and extending axially in the outer surface of said first protuberance for at least a part of the axial length thereof, said stem being displaceable inwardly into said chamber for displacing said second protuberance inwardly into said chamber and displacing said second shoulder on said protuberance out of contact with the first shoulder in said opening so that the groove in said wall surface is in communication with the interior of said chamber placing the chamber in communication with the exterior of said wall means.

9. A member, as set forth in claim 8, wherein said groove in the annular recessed wall surface of said valve member being disposed in closely spaced relation to said second protuberance so that with the second shoulder on said second protuberance being in contact with the first shoulder at the opening of said wall means, flow from the interior of said chamber into said pressure is blocked.

10. A member, as set forth in claim 8, wherein said opening having an axially extending smaller diameter part extending outwardly from the first shoulder and an axially extending larger diameter part extending from the smaller diameter part toward the exterior of said wall means.

11. A member, as set forth in claim 9, wherein said first shoulder being formed by the inside surface of said wall means.

12. A member, as set forth in claim 8, wherein the axial length between said first and second shoulder in said opening being greater than the axial length between said first and second shoulders on said protuberances on said valve member so that the valve member is stretched when seated against the shoulders in said opening and is held thereon in tightly fitted engagement.

13. A member, as set forth in claim 8, wherein said stem having an axial length between the first and second ends thereof which is greater than the axial length of the bore in said valve member from said groove to the first end of said valve member.

14. A member, as set forth in claim 8, wherein an annular groove formed in the bore in said valve member at the inner end thereof, and a toroidally shaped projecting portion formed on said stem at the second end thereof with said projecting portion seated within the annular groove in said valve member.

15. A member, as set forth in claim 14, wherein said bore in said valve member having a reduced cross-sectional portion extending between said annular groove therein and said slit in the second end thereof.

16. A member, as set forth in claim 8, wherein said first protuberance being located at the first end of said valve member and said second protuberance being spaced from the second end of said valve member, and the outer surface of said valve member tapering inwardly from the second protuberance to the second end of said valve member.

17. A member, as set forth in claim 8, wherein said valve member being formed of an elastomeric material compatible with butane.

18. A member, as set forth in claim 17, wherein said stem being formed of brass.

19. A member, as set forth in claim 17, wherein said stem being formed of a zinc die casting.

20. A member, as set forth in claim 8, wherein a third shoulder formed on said wall means spaced axially outwardly from said second shoulder said stem having an outwardly projecting flange thereon between the first end of said valve member and the first end of said stem, said flange projecting outwardly a sufficient distance to contact said third shoulder when said stem is pressed inwardly for opening said valve member.

* * * * *